United States Patent
Kong et al.

(10) Patent No.: US 10,818,937 B2
(45) Date of Patent: Oct. 27, 2020

(54) SEPARATION PLATE, MANUFACTURING METHOD THEREFOR, AND FUEL CELL STACK COMPRISING SAME

(71) Applicant: LG CHEM, LTD., Seoul (KR)

(72) Inventors: Chang Sun Kong, Daejeon (KR); Jae Choon Yang, Daejeon (KR); Hye Mi Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 181 days.

(21) Appl. No.: 15/737,942

(22) PCT Filed: Jun. 17, 2016

(86) PCT No.: PCT/KR2016/006463
§ 371 (c)(1),
(2) Date: Dec. 19, 2017

(87) PCT Pub. No.: WO2017/003116
PCT Pub. Date: Jan. 5, 2017

(65) Prior Publication Data
US 2018/0175406 A1 Jun. 21, 2018

(30) Foreign Application Priority Data
Jun. 30, 2015 (KR) .......................... 10-2015-0093717

(51) Int. Cl.
*H01M 8/0265* (2016.01)
*H01M 8/2483* (2016.01)
(Continued)

(52) U.S. Cl.
CPC ....... *H01M 8/0265* (2013.01); *H01M 8/2465* (2013.01); *H01M 8/2483* (2016.02);
(Continued)

(58) Field of Classification Search
CPC .................................................. H01M 8/0265
See application file for complete search history.

(56) References Cited

U.S. PATENT DOCUMENTS

| | | | |
|---|---|---|---|
| 9,065,090 B2 | 6/2015 | Kawajiri et al. | |
| 2002/0004158 A1* | 1/2002 | Suzuki | H01M 8/0267 429/509 |

(Continued)

FOREIGN PATENT DOCUMENTS

| | | |
|---|---|---|
| JP | 2012-199093 A | 10/2012 |
| JP | 2012-243570 A | 12/2012 |

(Continued)

OTHER PUBLICATIONS

TranslationOfJP2013103231 (Year: 2019).*
(Continued)

*Primary Examiner* — Brian R Ohara
(74) *Attorney, Agent, or Firm* — Birch, Stewart, Kolasch & Birch, LLP

(57) ABSTRACT

The present invention relates to a separation plate, a manufacturing method therefor, and a fuel cell stack comprising the same, and according to one aspect of the present invention, provided is a separation plate having: a first surface and a second surface in a direction opposite to that of the first surface; a plurality of channel elements protruding from the second surface toward the first surface, wherein each of the channel elements is arranged to have an inlet port and an outlet port along the flowing direction of a fluid flowing on the first surface; and a rib having a height varying along the circumferential direction of a virtual axis connecting the inlet port and the outlet port, wherein at least a partial region of an outer surface of the rib is formed into a cycloid curved surface along the circumferential direction of the virtual axis.

19 Claims, 7 Drawing Sheets

(51) Int. Cl.
*H01M 8/2465* (2016.01)
*H01M 8/0206* (2016.01)
*H01M 8/1018* (2016.01)

(52) U.S. Cl.
CPC .. *H01M 8/0206* (2013.01); *H01M 2008/1095* (2013.01); *Y02P 70/56* (2015.11)

(56) References Cited

U.S. PATENT DOCUMENTS

| | | | | |
|---|---|---|---|---|
| 2003/0077501 | A1* | 4/2003 | Knights | H01M 8/0228 429/435 |
| 2010/0285395 | A1* | 11/2010 | Hayashi | H01M 8/0232 429/513 |
| 2012/0301810 | A1* | 11/2012 | Kawajiri | H01M 8/026 429/482 |
| 2016/0248104 | A1 | 8/2016 | Konno | |

FOREIGN PATENT DOCUMENTS

| | | |
|---|---|---|
| JP | 2013-103231 A | 5/2013 |
| JP | 2015-72755 A | 4/2015 |

OTHER PUBLICATIONS

Definitions (Year: 2020).*
International Search Report for PCT/KR2016/006463 dated Sep. 12, 2016.

* cited by examiner

[Figure 1]
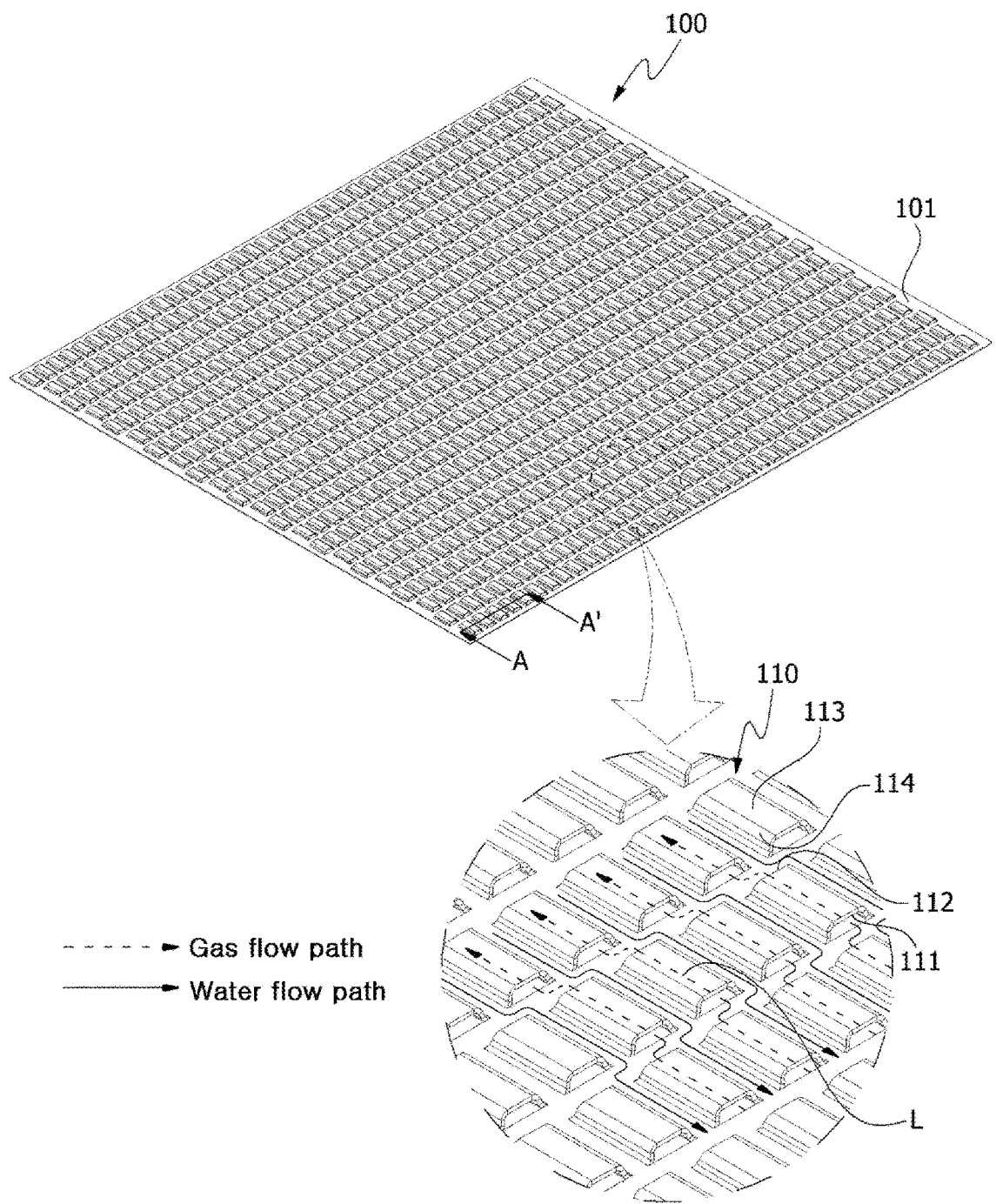

[Figure 2]
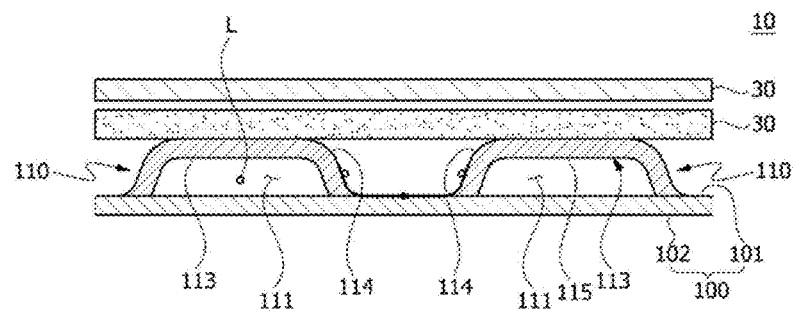
[Figure 3]
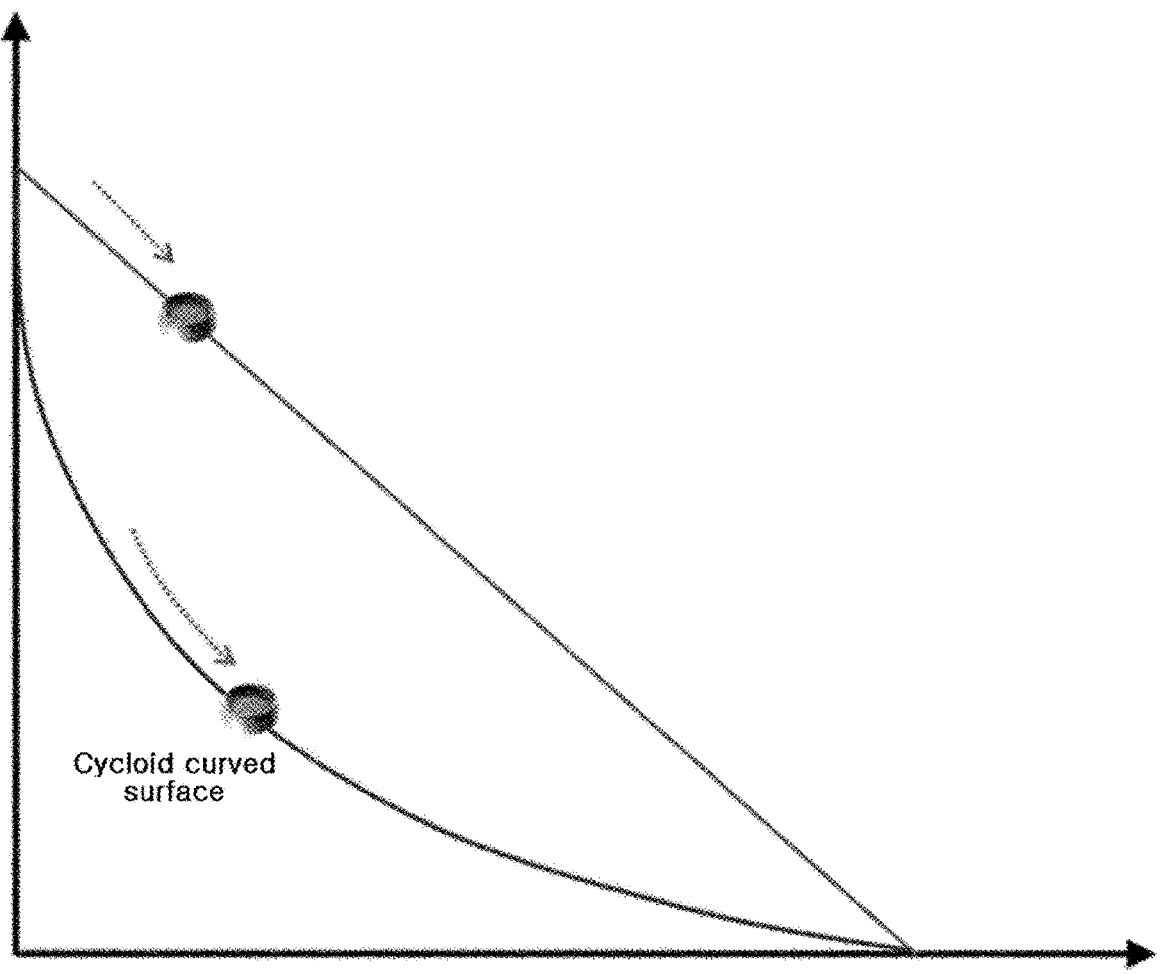
Cycloid curved surface

[Figure 4]
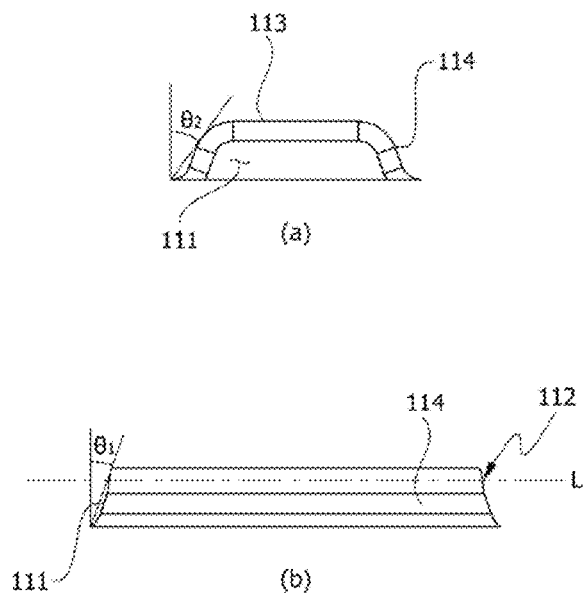
[Figure 5]
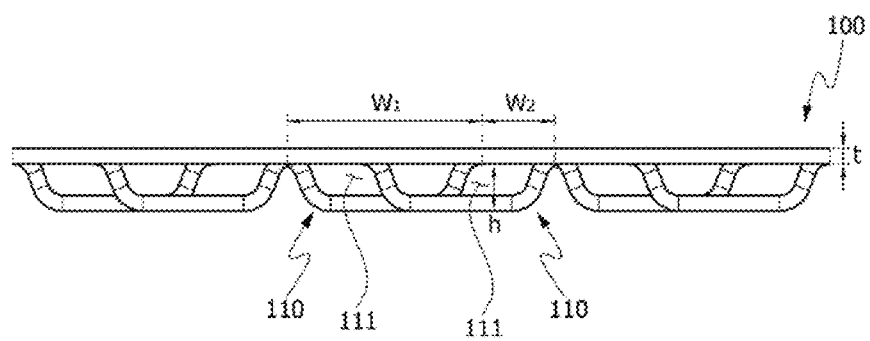

[Figure 6]
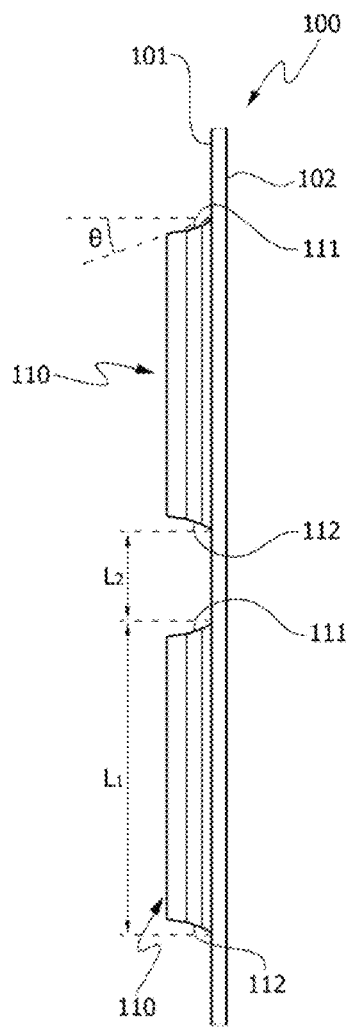

[Figure 7]
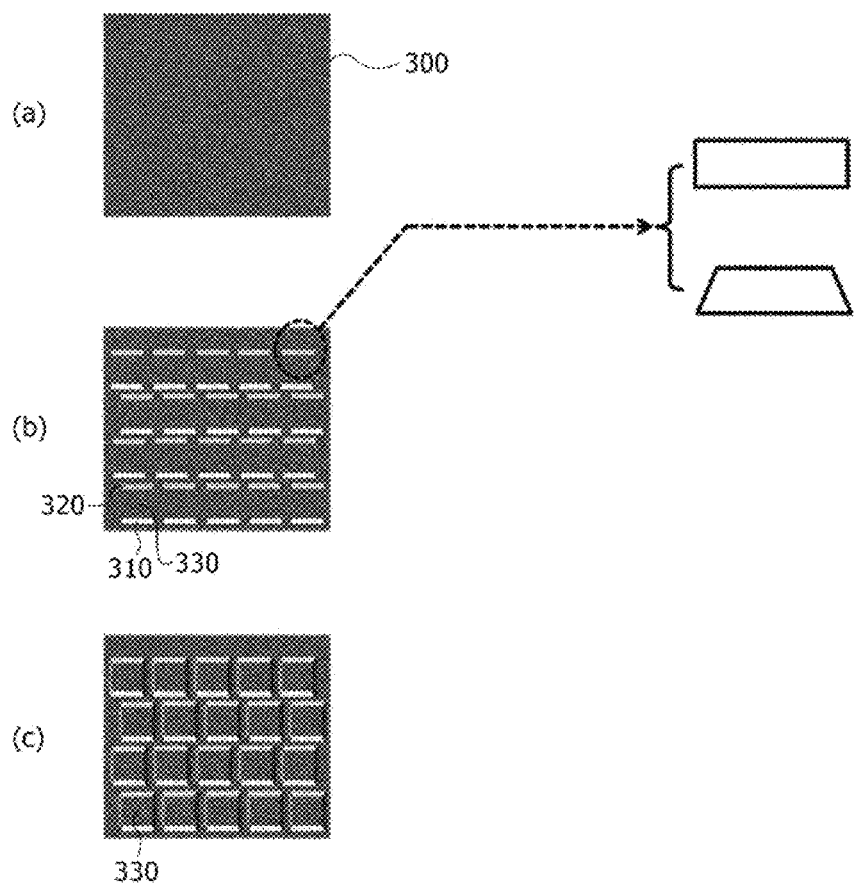
[Figure 8]
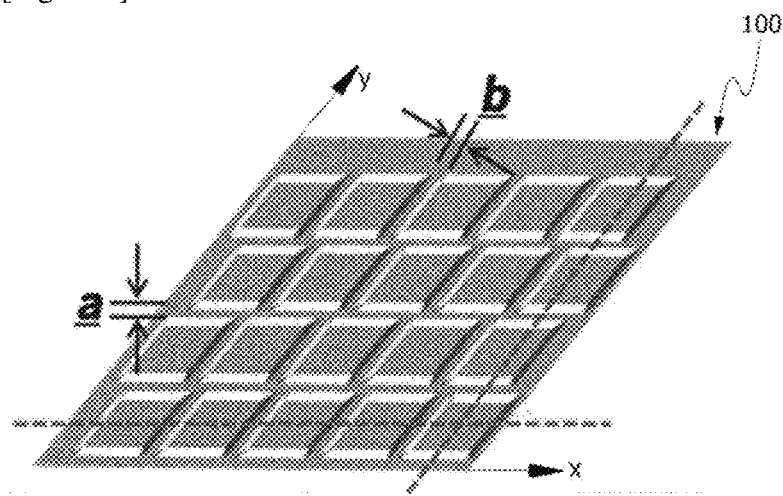

[Figure 9]
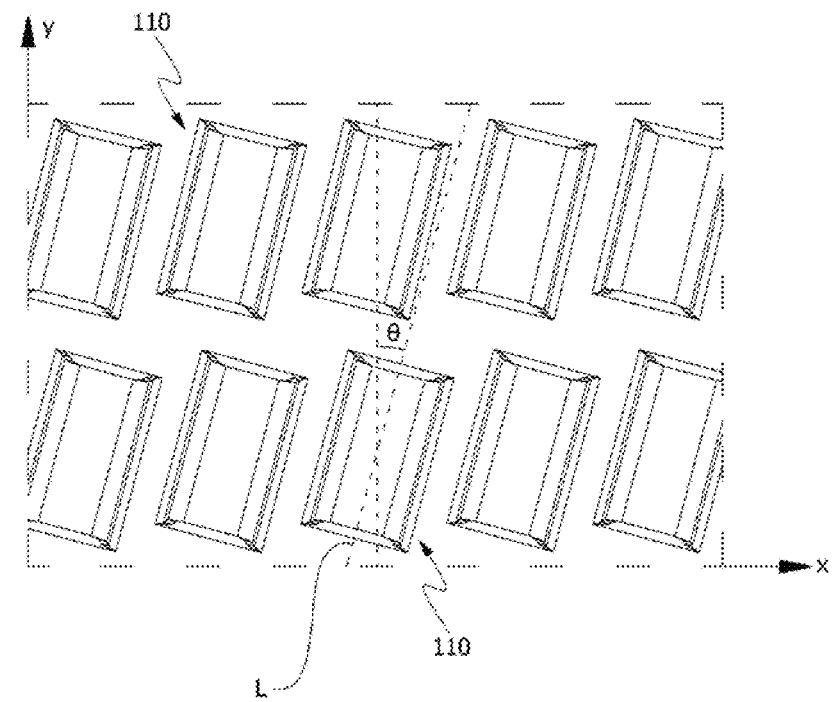
[Figure 10]
- - - - → Gas flow path
———— → Water flow path
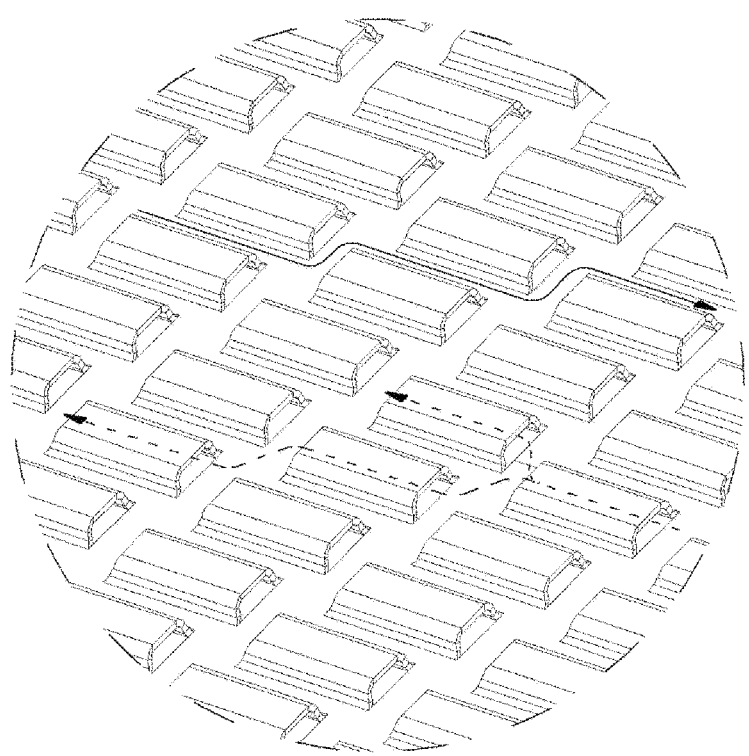

[Figure 11]
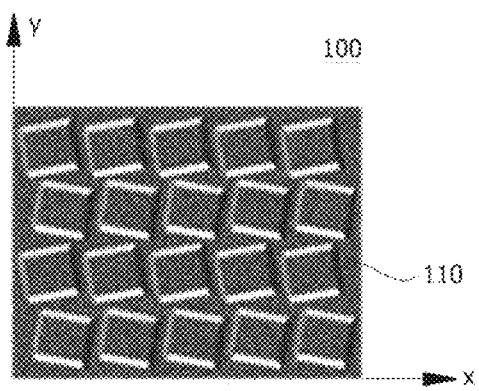
(a)
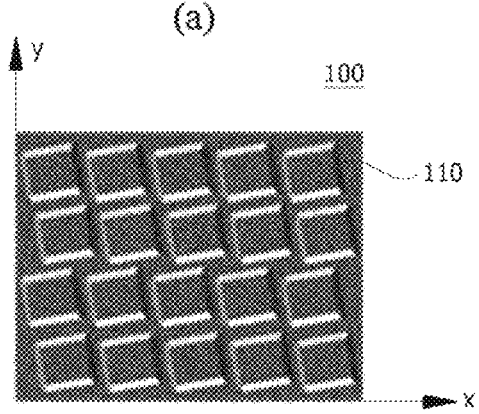
(b)

SEPARATION PLATE, MANUFACTURING METHOD THEREFOR, AND FUEL CELL STACK COMPRISING SAME

TECHNICAL FIELD

The present invention relates to a separation plate, a manufacturing method therefor, and a fuel cell stack comprising the same.

The present application claims the benefit of priority based on Korean Patent Application No. 10-2015-0093717 filed on Jun. 30, 2015, the disclosure of which is incorporated herein by reference in its entirety.

BACKGROUND ART

Generally, a fuel cell is an energy conversion device that generates electrical energy through an electrochemical reaction between a fuel and an oxidizer and has an advantage that electric power can be consistently generated as long as the fuel is continuously supplied.

A polymer electrolyte membrane fuel cell (PEMFC), which uses a polymer membrane as an electrolyte capable of permeating hydrogen ions, has a low operating temperature of about 100° C. as compared to other types of fuel cells, and has advantages of high energy conversion efficiency, high output density and fast response characteristics. Besides, since it can be miniaturized, it can be provided as portable, vehicle and household power supplies.

The polymer electrolyte membrane fuel cell stack comprises a membrane-electrode assembly (MEA) having an electrode layer formed by applying an anode and a cathode, respectively, around an electrolyte membrane composed of a polymer material, a gas diffusion layer (GDL) for serving to distribute reaction gases evenly and to transfer the generated electric energy, a separating plate (bipolar plate) for supplying reaction gases to the gas diffusion layer and discharging the generated water, and a gasket for preventing leakage of the reaction gases and the cooling fluid which flowsbetween the separating plates for regulating the stack temperature.

Conventional separating plates for a fuel cell stack are configured such that the flows of the reaction gas and the resulting water travel in the same direction through two-dimensional channels or are distributed and discharged through intersecting three-dimensional solid shapes. However, they have a structure that is not suitable for efficiently discharging a variable amount of water under various operation conditions, thereby having a problem of deteriorating the performance of the fuel cell stack.

DISCLOSURE

Technical Problem

It is an object of the present invention to provide a separation plate capable of efficiently distributing a gas flow and a liquid (e.g., water) flow in the separation plate, a manufacturing method therefor, and a fuel cell stack comprising the same.

In addition, it is another object of the present invention to provide a separation plate capable of optimizing a gas flow and a liquid (e.g., water) flow in the separation plate, a manufacturing method therefor, and a fuel cell stack comprising the same.

Furthermore, it is another object of the present invention to provide a separation plate capable of reversely forming a gas flow direction and a liquid flow direction, a manufacturing method therefor, and a fuel cell stack comprising the same.

Also, it is another object of the present invention to provide a separation plate capable of minimizing mutual interference in a gas flow and a liquid flow, a manufacturing method therefor, and a fuel cell stack comprising the same.

Also, it is still another object of the present invention to provide a separation plate capable of improving a liquid discharge speed, a manufacturing method therefor, and a fuel cell stack comprising the same.

Technical Solution

In order to solve the above objects, there is provided a separation plate having a first surface and a second surface in the opposite direction of the first surface, and a plurality of channel elements protruding from the second surface toward the first surface.

Here, the channel elements are each provided to have an inlet port and an outlet port along the flow direction of the fluid flowing on the first surface and have a rib whose height varies along the circumferential direction of a virtual axis connecting the inlet port and the outlet port.

Also, at least a part of the outer circumferential surface of the rib is formed into a cycloid curved surface along the circumferential direction of the virtual axis.

In addition, at least one of the inlet port and the outlet port may be provided such that the flow direction cross section is inclined with respect to the virtual axis.

Furthermore, the inlet port and the outlet port may be provided so that as they are farther from the first surface, each flow direction cross section is closer to each other.

Also, at least one of the inlet port and the outlet port may be formed, so that the flow direction cross section has a polygonal shape.

In addition, the plurality of channel elements may be arranged apart from each other at a predetermined interval along the transverse direction and the longitudinal direction of the first surface, respectively.

Furthermore, two adjacent channel elements may be arranged so that the outlet port of one channel element and the inlet port of the other channel element overlap at least partially along the flow direction of a fluid.

Also, the channel elements may be provided such that the virtual axis connecting the inlet port and the outlet port is inclined with respect to the transverse axis and the longitudinal axis of the first surface, respectively.

In addition, according to another aspect of the present invention, there is provided a fuel cell stack comprising: a membrane-electrode assembly; a gas diffusion layer provided on one side of the membrane-electrode assembly; and a separation plate having a first surface disposed to face the gas diffusion layer and a second surface in the opposite direction of the first surface, and a plurality of channel elements protruding from the second surface toward the first surface so as to contact the gas diffusion layer.

Furthermore, the channel elements are each provided to have an inlet port and an outlet port along the flow direction of a reaction gas flowing on the first surface and have a rib whose height varies along the circumferential direction of a virtual axis connecting the inlet port and the outlet port.

Also, at least a part of the outer circumferential surface of the rib is formed into a cycloid curved surface along the circumferential direction of the virtual axis.

In addition, according to still another aspect of the present invention, there is provided a method for manufacturing a separation plate comprising a punching step of punching a metal plate so as to form a plurality of holes to be formed into an inlet port and an outlet port of a channel element; and a stamping step of stamping the metal plate so that the region between the pair of holes to be the inlet port and the outlet port of the channel element is protruded.

Advantageous Effects

As described above, the separation plate related to one embodiment of the present invention, the manufacturing method therefor, and the fuel cell stack comprising the same have the following effects.

It is possible to efficiently distribute the gas flow and the liquid (e.g., water) flow in the separation plate and to optimize the gas flow and the liquid (e.g., water) flow in the separation plate. Particularly, by increasing the ratio of the flow direction cross section widths in the gas flow path and the liquid flow path, it is induced for the condensation of the liquid in the flow path having a small cross-sectional area to be capable of occurring more quickly.

Furthermore, the direction of the gas flow and the direction of the liquid flow can be formed in reverse. In particular, the difference in the flow path widths causes a difference in the gas flow rates passing through the gas flow path and the liquid flow path. Specifically, a liquid flow may be formed in the opposite direction with the gas flow, by applying a negative pressure to the flow path (liquid flow path) having a narrow width.

In addition, it is possible to minimize mutual interference in the gas flow and the liquid flow. Specifically, a relatively narrow flow path having a small cross-sectional area becomes a liquid flow path for the liquid flow and a relatively wide flow path having a large cross-sectional area becomes a gas flow path for the gas flow (reaction gas or the like), so that the gas and liquid flow regions can be effectively separated.

Furthermore, sizes, shapes and moving directions of droplets can be adjusted by adjusting the vertical draft angle of the wall surface of the liquid flow path based on the cycloid curved surface shape. Particularly, when the droplet descends to the channel bottom over condensation and growth on the channel wall surface, the cycloid curved surface becomes the shortest distance descent line. Therefore, the liquid discharge speed can be improved.

In addition, in the fuel cell stack, it is possible to efficiently discharge water generated by the cell chemical reaction or condensation of moisture in the reaction gas, thereby minimizing the flooding phenomenon and expanding the electrical contact surface of the separation plate and the gas diffusion layer.

BRIEF DESCRIPTION OF DRAWINGS

FIG. 1 is a perspective view of a separation plate related to one embodiment of the present invention.

FIG. 2 is a cross-sectional view of a fuel cell stack related to one embodiment of the present invention.

FIG. 3 is a graph for explaining a cycloid curved surface applied to a channel element constituting a separation plate related to one embodiment of the present invention.

FIGS. 4 to 6 are views showing channel elements constituting a separation plate related to one embodiment of the present invention.

FIG. 7 is a schematic diagram for explaining a method for manufacturing a separation plate related to one embodiment of the present invention.

FIG. 8 is a schematic diagram showing a separation plate related to one embodiment of the present invention.

FIG. 9 is a top view showing a separation plate related to one embodiment of the present invention.

FIG. 10 is a perspective view for explaining fluid flows in the separation plate shown in FIG. 9.

FIG. 11 is a schematic diagram showing a separation plate related to one embodiment of the present invention.

MODE FOR INVENTION

Hereinafter, a separation plate according to an embodiment of the present invention, a manufacturing method therefor, and a fuel cell stack comprising the same will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 1 is a perspective view of a separation plate (100) related to one embodiment of the present invention, and FIG. 2 is a cross-sectional view of a fuel cell stack (10) related to one embodiment of the present invention.

In addition, FIG. 3 is a graph for explaining a cycloid curved surface applied to a channel element constituting a separation plate (100) related to one embodiment of the present invention and FIGS. 4 to 6 are views showing channel elements (110) constituting a separation plate related to one embodiment of the present invention.

The fuel cell stack (10) related to one embodiment of the present invention comprises a membrane-electrode assembly (20) and a gas diffusion layer (30) provided on one side of the membrane-electrode assembly (20), and a separation plate (100).

Referring to FIGS. 1 and 2, the separation plate (100) has a first surface (101) and a second surface (102) in the opposite direction of the first surface (101), and a plurality of channel elements (110) protruding from the second surface (102) toward the first surface (101).

The channel elements (110) are each provided to have an inlet port (111) and an outlet port (112) along the flow direction of the fluid (reaction gas flow path in FIG. 1) flowing on the first surface (101). Also, the channel element (110) has a rib (113) whose height varies along the circumferential direction of a virtual axis (L) connecting the inlet port (111) and the outlet port (112).

In particular, the channel elements (110) are disposed so that the first surface faces the gas diffusion layer (30). In addition, the channel elements (110) are disposed such that the ribs (113) contact the gas diffusion layer (30).

Referring to FIGS. 2 and 3, at least a part of the outer circumferential surface (114) of the rib (113) is formed into a cycloid curved surface along the circumferential direction of the virtual axis (L). Here, the outer circumferential surface (114) of the rib (113) is a surface continuous with the first surface (101) of the separation plate (100). Specifically, the outer circumferential surface of the channel element (110) may mean a surface continuous with the first surface (101), and the inner circumferential surface of the channel element (110) may mean a surface continuous with the second surface (102). Also, the inner circumferential surface of the channel element (110) is formed into a curved surface. In addition, the inlet port (111) may mean an opening formed by the outer circumferential edge on the upstream side of the rib (113) and the first surface (101), and the outlet port (112) may mean an opening formed by the outer circumferential edge on the downstream side of the rib (113) and the first surface (101).

Here, the flow of gas (reaction gas or fuel) can be made through the inside of the adjacent channel elements, and the flow of water can be made through the outside (the region between outer circumferential surfaces) of the adjacent channel elements. Specifically, it may be provided that water flows into the space formed by outer circumferential surfaces of two adjacent ribs (113). At this time, the inlet port (111) of the channel element (110) may be formed so that the size of the flow direction cross section (the cross sectional area of the gas flow path) is larger than the size of the cross section (the cross sectional area of the water flow path) formed by outer circumferential surfaces of two adjacent ribs (113).

In one embodiment, referring to FIG. 4, at least one of the inlet port (111) and the outlet port (112) in the channel element (110) may be provided such that the flow direction cross section is inclined at a predetermined angle with regard to the virtual axis (L). In addition, the inlet port (111) and the outlet port (112) of the channel element (110) may be provided so that as they are farther from the first surface (101), each flow direction cross section is closer to each other. Specifically, as the inlet port (111) is farther from the first surface (101) of the separation plate (100), the flow direction cross section can be inclined toward the outlet port (112), and as the outlet port (111) is farther from the first surface (101) of the separation plate (100), the flow direction cross section can be inclined toward the inlet port (111). In addition, the inlet port (111) and the outlet port (112) may be provided such that as they are closer to the gas diffusion layer (30), each flow direction cross section is closer to each other.

In addition, referring to FIG. 4, the outer circumferential surface (114) of the rib (113), which is the side wall of the channel element (110), can be inclined at a predetermined angle with regard to the virtual vertical line passing through the first surface (101) and the second surface (102) of the separation plate (100).

Referring to FIGS. 1 and 5, two adjacent channel elements (110) may be arranged so that the outlet port (112) of one channel element (110) and the inlet port (111) of the other channel element (110) overlap at least partially along the flow direction of a fluid (for example, a reaction gas or a fuel). In addition, referring to FIG. 6, the length (L1) of the channel elements may be set to be longer than the spacing (L2) between the channel elements. In FIG. 6, the spacing (L2) between the channel elements means the distance between the outlet port (112) of one channel element (110) and the inlet port (111) of the other channel element (110).

FIG. 7 is a schematic diagram for explaining a method for manufacturing a separation plate related to one embodiment of the present invention.

Referring to FIGS. 1 and 7, a method for manufacturing a separation plate comprises a punching step of punching a metal plate (300) so as to form a plurality of holes (310, 320) to be formed into an inlet port (111) and an outlet port (112) of a channel element (110), respectively, and a stamping step of stamping the metal plate so that the region (330) between the pair of holes (310, 320) to be the inlet port (111) and the outlet port (112) of the channel element (110) is protruded. The region (330) between the pair of holes (310, 320) constitutes the rib (113) after the stamping process. The holes (310, 320) may also have a polygonal shape so as to correspond to the inlet port (111) and the outlet port (112) of the channel element (110), and for example, the holes (310, 320) may be formed to have a rectangular or trapezoidal shape. In addition, the pair of holes (310, 320) may be formed to have a symmetrical shape based on the region to be protruded. Furthermore, the metal plate (separation plate) may have a thickness of, for example, 0.2 mm or less, and the protruding height of the region (rib) between the pair of holes in the stamping step may be 0.2 mm to 0.45 mm.

FIG. 8 is a schematic diagram showing a separation plate related to one embodiment of the present invention.

Referring to FIG. 8, a plurality of channel elements may be arranged apart from each other at a predetermined interval (a, b) along the transverse direction (e.g., x axis) and the longitudinal direction (e.g., y axis) of the first surface. Also, the interval can control the widths or cross-sectional areas of the flow direction cross sections in the liquid flow path (water) and the gas flow path (reaction gas or fuel), thereby adjusting the pressure loss and the liquid flow direction, and the like.

Referring to FIGS. 5 and 8, it is possible to efficiently distribute a gas flow (reaction gas or fuel) (inside the channel element) and a liquid (e.g., water) flow (outside the channel element) in the separation plate and to optimize the gas flow and the liquid (e.g., water) flow in the separation plate. Particularly, by increasing the ratio of the flow direction cross section widths in the gas flow path and the liquid flow path, it is induced for the condensation of the liquid in the flow path having a small cross-sectional area to be capable of occurring more quickly.

The flow path of a relatively narrow width (w2) having a small cross-sectional area becomes a liquid flow path for the liquid flow, and the flow path of a relatively wide width (w1) having a large cross-sectional area becomes a gas flow path for the gas flow (reaction gas or the like), so that the gas and liquid flow regions can be effectively separated.

FIG. 9 is a top view showing a separation plate related to one embodiment of the present invention, FIG. 10 is a perspective view for explaining fluid flows in the separation plate shown in FIG. 9, and FIG. 11 is a schematic diagram showing a separation plate related to one embodiment of the present invention.

The channel elements (110) may be provided such that the virtual axis (L) connecting the inlet port (111) and the outlet port (112) is inclined at a predetermined angel (θ) with respect to the transverse axis (for example, x axis) and the longitudinal axis (for example, y axis) of the first surface (101) of the separation plate (100), respectively. In such a structure, the gas flow path and the water flow path can be each formed, as shown in FIG. 9b.

Referring to FIG. 11, the arrangement of each channel element (110) may be variously set, and also the tilt angles of each channel element (110) may also be set different from each other.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the present invention, in a fuel cell stack, it is possible to efficiently discharge water generated by the cell chemical reaction or condensation of moisture in the reaction gas, thereby minimizing the flooding phenomenon and expanding the electrical contact surface of the separation plate and the gas diffusion layer.

The invention claimed is:

1. A separation plate having a first surface and a second surface in the opposite direction of the first surface, and a plurality of channel elements protruding only from the second surface toward the first surface,
   wherein the channel elements are each provided to have an inlet port and an outlet port along a flow direction of a fluid flowing on the first surface, and have a rib whose height varies along a circumferential direction of a virtual axis connecting the inlet port and the outlet port, and
   wherein an entire part of an outer circumferential surface of the rib is formed into a single cycloid curved surface along the circumferential direction of the virtual axis.

2. The separation plate according to claim 1,
   wherein at least one of the inlet port and the outlet port is provided such that a flow direction cross section is inclined with respect to the virtual axis.

3. A separation plate having a first surface and a second surface in the opposite direction of the first surface, and a plurality of channel elements protruding from the second surface toward the first surface,
   wherein the channel elements are each provided to have an inlet port and an outlet port along a flow direction of a fluid flowing on the first surface, and have a rib whose height varies along a circumferential direction of a virtual axis connecting the inlet port and the outlet port, and
   wherein at least a part of an outer circumferential surface of the rib is formed into a cycloid curved surface along the circumferential direction of the virtual axis,
   wherein at least one of the inlet port and the outlet port is provided such that a flow direction cross section is inclined with respect to the virtual axis, and
   wherein the inlet port and the outlet port are provided so that as they are farther from the first surface, each flow direction cross section is closer to each other.

4. The separation plate according to claim 1,
   wherein the plurality of channel elements are arranged apart from each other at a predetermined interval along a transverse direction and a longitudinal direction of the first surface, respectively.

5. The separation plate according to claim 4,
   wherein two adjacent channel elements are arranged so that the outlet port of one channel element and the inlet port of the other channel element overlap at least partially along the flow direction of the fluid.

6. The separation plate according to claim 1,
   wherein the channel elements are provided such that the virtual axis connecting the inlet port and the outlet port is inclined with respect to a transverse axis and a longitudinal axis of the first surface, respectively.

7. A fuel cell stack comprising:
   a membrane-electrode assembly;
   a gas diffusion layer provided on one side of the membrane-electrode assembly; and
   a separation plate having a first surface disposed to face the gas diffusion layer and a second surface in the opposite direction of the first surface, and a plurality of channel elements only protruding from the second surface toward the first surface so as to contact the gas diffusion layer,
   wherein the channel elements are each provided to have an inlet port and an outlet port along a flow direction of a reaction gas flowing on the first surface, and have a rib whose height varies along a circumferential direction of a virtual axis connecting the inlet port and the outlet port, and
   wherein an entire part of an outer circumferential surface of the rib is formed into a single cycloid curved surface along the circumferential direction of the virtual axis.

8. The fuel cell stack according to claim 7,
   provided such that water flows into a space formed by the outer circumferential surfaces of two adjacent ribs.

9. The fuel cell stack according to claim 7,
   wherein the inlet port is formed so that a size of the flow direction cross section is larger than a size of the cross section formed by the outer circumferential surfaces of two adjacent ribs.

10. The fuel cell stack according to claim 7,
    wherein at least one of the inlet port and the outlet port is provided such that a flow direction cross section is inclined with respect to the virtual axis.

11. A fuel cell stack comprising:
    a membrane-electrode assembly;
    a gas diffusion layer provided on one side of the membrane-electrode assembly; and
    a separation plate having a first surface disposed to face the gas diffusion layer and a second surface in the opposite direction of the first surface, and a plurality of channel elements protruding from the second surface toward the first surface so as to contact the gas diffusion layer,
    wherein the channel elements are each provided to have an inlet port and an outlet port along a flow direction of a reaction gas flowing on the first surface, and have a rib whose height varies along a circumferential direction of a virtual axis connecting the inlet port and the outlet port,
    wherein at least a part of an outer circumferential surface of the rib is formed into a cycloid curved surface along the circumferential direction of the virtual axis, and
    wherein the inlet port and the outlet port are provided such that as they are closer to the gas diffusion layer, each flow direction cross section is closer to each other.

12. The fuel cell stack according to claim 7,
    wherein the plurality of channel elements are arranged apart from each other at a predetermined interval along a transverse direction and a longitudinal direction of the first surface.

13. The fuel cell stack according to claim 7,
    wherein two adjacent channel elements are arranged such that the outlet port of one channel element and the inlet port of the other channel element overlap at least partially along the flow direction of the reaction gas.

14. The fuel cell stack according to claim 7,
    wherein the channel elements are provided such that the virtual axis connecting the inlet port and the outlet port is inclined with respect to a transverse axis and a longitudinal axis of the separation plate, respectively.

15. A method for manufacturing the separation plate of claim 1, the method comprising:
    a punching step of punching a metal plate so as to form a plurality of holes to be formed into the inlet ports and the outlet ports of the plurality of channel elements; and
    a stamping step of stamping the metal plate so that a region between the pair of holes to be the inlet port and the outlet port of each channel element is protruded.

16. The method for manufacturing the separation plate according to claim 15,
    wherein the holes are formed to have a polygonal shape.

17. The method for manufacturing the separation plate according to claim 16,
   wherein the holes are formed to have a rectangular or trapezoidal shape.

18. The method for manufacturing the separation plate according to claim 16,
   wherein a pair of regions are formed to have a symmetrical shape based on the region to be protruded.

19. The method for manufacturing the separation plate according to claim 15,
   wherein the metal plate has a thickness of 0.2 mm or less, and
   the protruding height of the region between the pair of holes in the stamping step is 0.2 mm to 0.45 mm.

* * * * *